(12) United States Patent
Acimovic et al.

(10) Patent No.: US 11,424,095 B1
(45) Date of Patent: Aug. 23, 2022

(54) PASSIVE THERMAL CONTROL OF X-RAY TUBES (71) Applicant: General Electric Company, Schenectady, NY (US)

(72) Inventors: Srdjan Acimovic, Milwaukee, WI (US); Edward Emaci, Brookfield, WI (US); Michael John Utschig, Wauwatosa, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 657 days.

(21) Appl. No.: 16/451,313

(22) Filed: Jun. 25, 2019

Related U.S. Application Data (63) Continuation of application No. 16/190,679, filed on Nov. 14, 2018, now abandoned.

(51) Int. Cl.
| | |
|---|---|
| A61B 6/00 | (2006.01) |
| H01J 35/10 | (2006.01) |
| G01T 1/16 | (2006.01) |
| G01T 7/00 | (2006.01) |

(52) U.S. Cl.
CPC .............. *H01J 35/106* (2013.01); *G01T 1/16* (2013.01); *G01T 7/00* (2013.01)

(58) Field of Classification Search
CPC .............. H01J 35/106; G01T 1/16; G01T 7/00
See application file for complete search history.

(56) References Cited

U.S. PATENT DOCUMENTS

| 5,416,820 A * | 5/1995 | Weil ...................... H01J 35/107 378/127 |
| 6,453,010 B1 * | 9/2002 | Miller .................... H05G 1/025 378/127 |
| 2012/0106709 A1 | 5/2012 | Hockersmith et al. |

FOREIGN PATENT DOCUMENTS

EP            2487702 A1 *  8/2012  ............ F16C 37/002

* cited by examiner

*Primary Examiner* — Kiho Kim
(74) *Attorney, Agent, or Firm* — Fletcher Yoder, P.C.

(57) ABSTRACT

A system for passive thermal control of an X-ray tube is provided. The system includes an X-ray tube having an electron beam target and including a rotary bearing assembly supporting the electron beam target in rotation. The rotary bearing assembly includes a stationary shaft and a bearing sleeve configured to rotate with respect to the stationary shaft during operation of the X-ray tube. The rotary bearing assembly also includes a first coolant flow path extending through a center of the stationary shaft and a second coolant flow path disposed through a radially inward portion of the stationary shaft disposed about the center of the stationary shaft. The rotary bearing assembly further includes a flow control valve configured to passively regulate flow of coolant through the second coolant flow path based on a pressure of the coolant.

20 Claims, 9 Drawing Sheets

PASSIVE THERMAL CONTROL OF X-RAY TUBES

CROSS-REFERENCE TO RELATED APPLICATION

This application claims priority to and the benefit of U.S. patent application Ser. No. 16/190,679, entitled "PASSIVE THERMAL CONTROL OF X-RAY TUBES", filed Nov. 14, 2018, which is herein incorporated by reference in its entirety for all purposes.

BACKGROUND

The subject matter disclosed herein relates to X-ray tubes used in medical imaging and, in particular, to the thermal control of X-ray tubes.

In non-invasive imaging systems, X-ray tubes are used in fluoroscopy, projection X-ray, tomosynthesis, and computer tomography (CT) systems as a source of X-ray radiation. Typically, the X-ray tube includes a cathode and a target. A thermionic filament within the cathode emits a stream of electrons towards the target in response to heat resulting from an applied electrical current, with the electrons eventually impacting the target. Once the target is bombarded with the stream of electrons, it produces X-ray radiation and heat.

The X-ray radiation traverses a subject of interest, such as a human patient, and a portion of the radiation impacts a detector or photographic plate where the image data is collected. Generally, tissues that differentially absorb or attenuate the flow of X-ray photons through the subject of interest produce contrast in a resulting image. In some X-ray systems, the photographic plate is then developed to produce an image which may be used by a radiologist or attending physician for diagnostic purposes. In digital X-ray systems, a digital detector produces signals representative of the received X-ray radiation that impacts discrete pixel regions of a detector surface. The signals may then be processed to generate an image that may be displayed for review. In CT systems, a detector array, including a series of detector elements, produces similar signals through various positions as a gantry is displaced around a patient.

The X-ray tube has a useful life over a large number of examination sequences, and must generally be available for examination sequences upon demand in a medical care facility, as examination sequences may or may not be scheduled, for example due to emergency situations. When the X-ray tube is not in use, the X-ray tube may cool between imaging sequences, as no electrons are being emitted by the thermionic element (i.e., substantially no heat is being generated). This cooling may result in the target material dropping below its ductile to brittle transition temperature, which can result in fracture of the target or reduced operating life. Existing techniques to warm X-ray tubes are often unreliable and inefficient, as typical thermal transition processes may take up to one hour and can over or undershoot a desired target temperature, resulting in instability of the target material. In such cases, image sequences may be delayed or, in cases where imaging sequences are performed before the target is properly warmed, the target may rupture. Accordingly, a need exists for improved thermal control in X-ray tubes.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a system for passive thermal control of an X-ray tube is provided. The system includes an X-ray tube having an electron beam target and including a rotary bearing assembly supporting the electron beam target in rotation. The rotary bearing assembly includes a stationary shaft and a bearing sleeve configured to rotate with respect to the stationary shaft during operation of the X-ray tube. The rotary bearing assembly also includes a first coolant flow path extending through a center of the stationary shaft and a second coolant flow path disposed through a radially inward portion of the stationary shaft disposed about the center of the stationary shaft. The rotary bearing assembly further includes a flow control valve configured to passively regulate flow of coolant through the second coolant flow path based on a pressure of the coolant.

In another embodiment, an imaging system is provided. The imaging system includes an X-ray tube having an electron beam target and including a rotary bearing assembly supporting the electron beam target in rotation. The rotary bearing assembly includes a stationary shaft and a bearing sleeve configured to rotate with respect to the stationary shaft during operation of the X-ray tube. The rotary bearing assembly also includes a first coolant flow path extending through a center of the stationary shaft and a second coolant flow path disposed through a radially inward portion of the stationary shaft disposed about the center of the stationary shaft. The rotary bearing assembly further includes a flow control valve configured to passively regulate flow of coolant through the second coolant flow path based on a pressure of the coolant. The imaging system also includes a digital detector configured to receive radiation from the X-ray tube transmitted through a subject of interest. The imaging system further includes an image acquisition circuit configured to control acquisition of image data from the detector.

In a further embodiment, a system for passive thermal control of an X-ray tube is provided. The system includes an X-ray tube having an electron beam target and including a rotary bearing assembly supporting the electron beam target in rotation. The rotary bearing assembly includes a stationary shaft and a bearing sleeve configured to rotate with respect to the stationary shaft during operation of the X-ray tube. The rotary bearing assembly also includes a first coolant flow path extending through a center of the stationary shaft. The stationary shaft includes a first end having an inlet for the first coolant flow path and a second end disposed opposite the first end having an outlet for the first coolant flow path. The rotary bearing assembly further includes a second coolant flow path disposed through a radially inward portion of the stationary shaft disposed about the center of the stationary shaft. The rotary bearing assembly even further includes a flow control valve configured to passively regulate flow of coolant through the second coolant flow path based on a pressure of the coolant. The flow control valve includes a spring disposed adjacent the first end or the second end of the stationary shaft. The flow control valve is configured when closed to block the coolant from entering the second coolant flow path, and the flow control valve is configured when open to allow the coolant to flow into the second coolant flow path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present approaches are directed towards a system and a method for passively controlling the temperature of various components within an X-ray tube. For example, in embodiments of an X-ray tube wherein the target is rotatably connected to a rotary bearing (e.g., spiral groove bearing), it may be possible to control (e.g., increase and/or decrease) a rate of heat flux from the rotating anode assembly of the X-ray tube via a flow control valve (e.g., a poppet valve or spring loaded plunger housed in a bearing assembly). The flow control valve responds passively (in an open loop manner) to variation in a flow rate (i.e., pressure) of the coolant (e.g., oil). During standby mode, the flow control valve may minimize the rate of heat flux from the rotating anode assembly, when it is advantageous to keep the target assembly in a non-brittle regime to keep from having to undergo X-ray tube warm up. Prior to start of an X-ray exposure and shortly afterwards, the flow control valve may maximize the rate of heat flux from the rotating anode assembly in order to maximize patient throughput. The rotary bearing includes a stationary shaft and a sleeve disposed about and configured to rotate about the stationary shaft. A first coolant flow path is disposed through a center of the stationary shaft (e.g., through a valve stem of the flow control valve disposed within the stationary shaft) and a second coolant flow path is disposed through a radially inward portion of the stationary shaft disposed about the center of the stationary shaft. During operation, coolant flows through the first coolant path to regulate a temperature of a stator region of the X-ray tube whether the flow control valve is open or closed. When the flow control valve is closed, it keeps coolant from flowing into the second coolant flow path to regulate a temperature of the rotary bearing. However, when the flow control valve is open, it allows coolant to flow into the second coolant flow path to regulate a temperature of the rotary bearing. The disclosed embodiments will allow utilization of the full power capability of the X-ray tube without needing to precondition the X-ray tube or warm up the X-ray tube from a standby state. This enables maximum patient throughput while enabling the operation of the target assembly in a non-brittle regime, thus, reducing the probability of target rupture due to high strain rates in a brittle regime.

Figure 1:
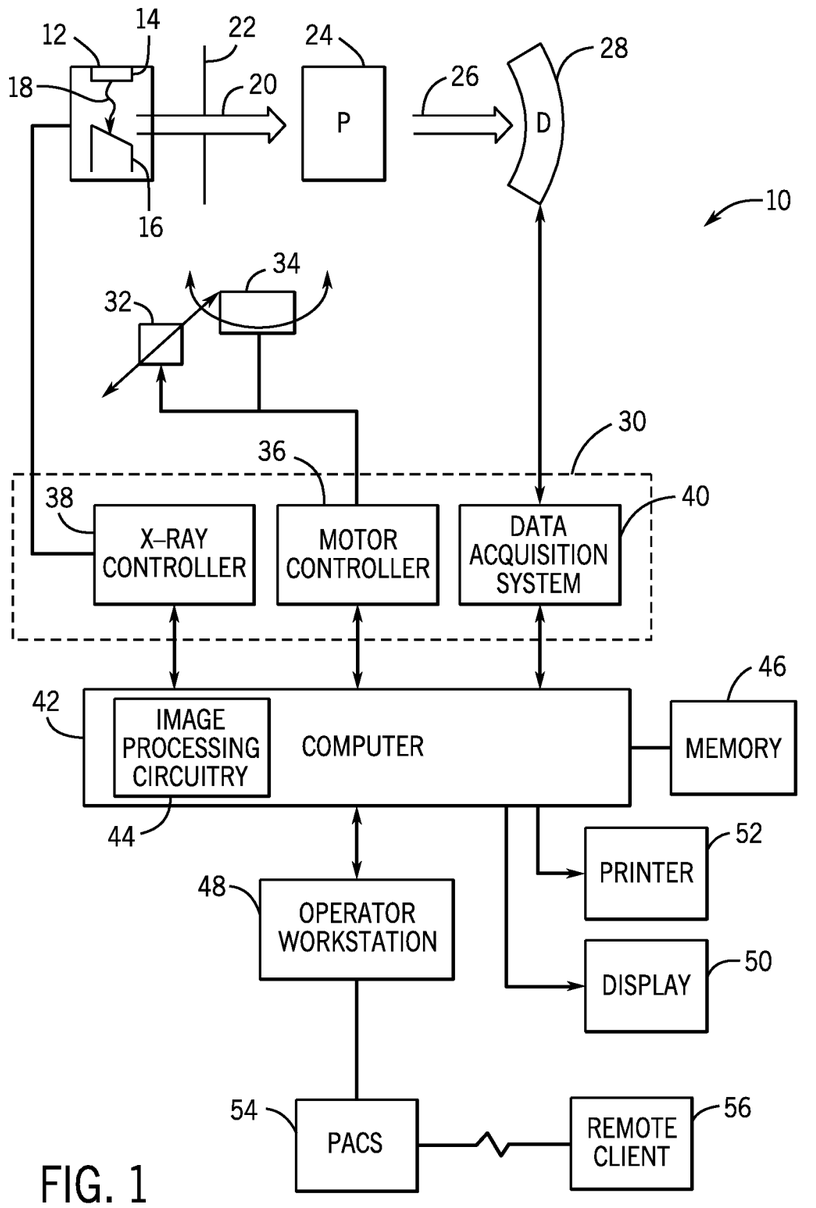
FIG. 1 is a system-level view of an embodiment of an imaging system in the form of a CT imaging system in which the temperature of the X-ray source is passively controlled, in accordance with embodiments of the present disclosure.

The thermal control system may be utilized in any X-ray tube, such as X-ray tubes utilized in fluoroscopy imaging systems, CT imaging systems, and so on. FIG. 1 illustrates such an imaging system 10 for acquiring and processing image data, and is one embodiment in which thermal control according to the present approaches may be utilized. In the illustrated embodiment, system 10 is a computed tomography (CT) system designed to acquire X-ray image data, to reconstruct a tomographic image based upon the data, and to process the image data for display and analysis. Though the imaging system 10 is discussed in the context of medical imaging, the techniques and configurations discussed herein are applicable in other non-invasive imaging contexts, such as baggage or package screening or industrial nondestructive evaluation of manufactured parts.

Figure 2:
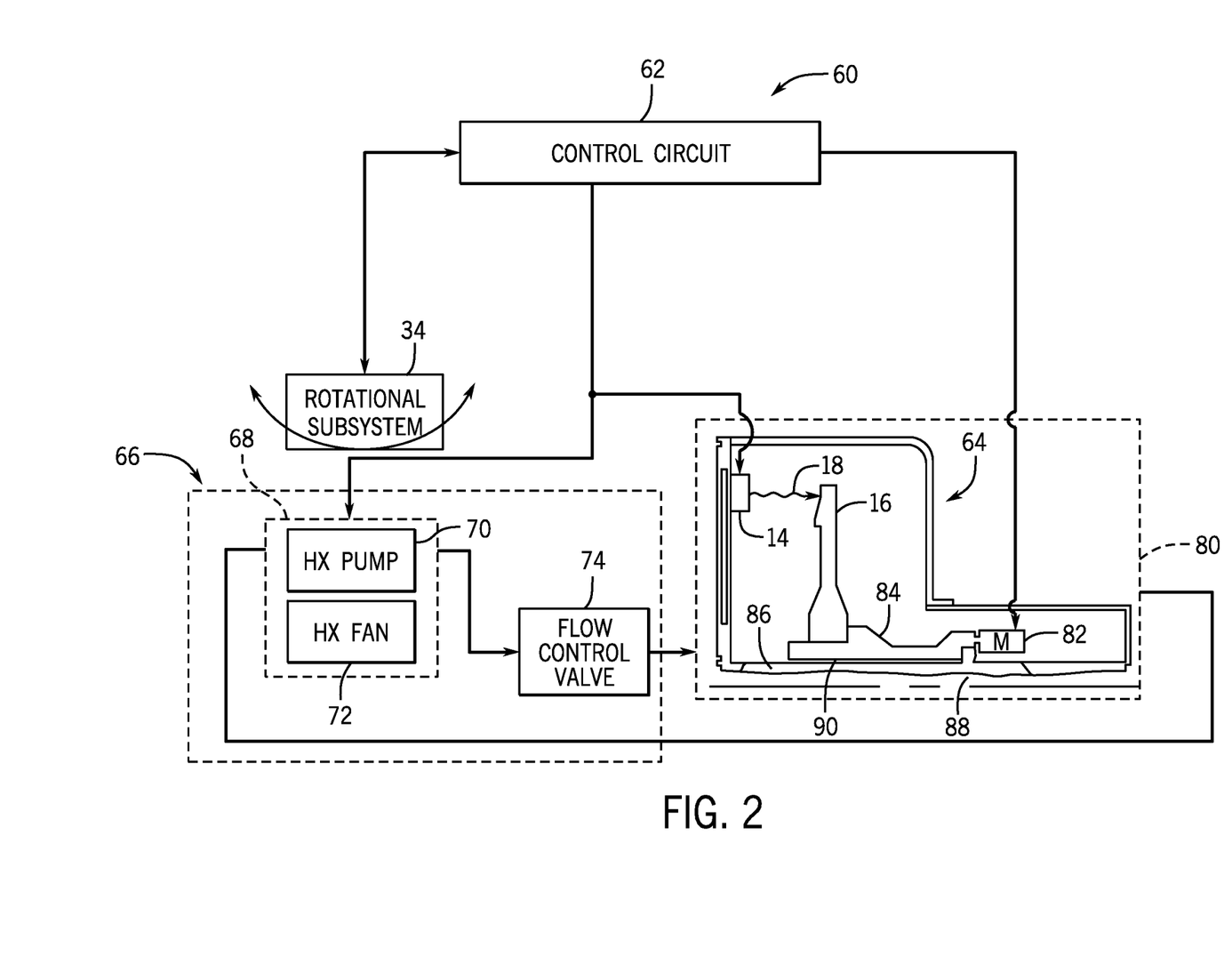
FIG. 2 is a schematic illustration of an embodiment of a thermal control system for passively controlling the temperature of an X-ray tube, in accordance with embodiments of the present disclosure.

In the embodiment illustrated in FIG. 1, the CT imaging system 10 includes an X-ray source 12, which may be thermally controlled in accordance with present embodiments, and is described in further detail below with respect to FIGS. 2 and 3. As discussed in detail below, the source 12 may include one or more X-ray tubes. For example, the source 12 may include an X-ray tube with a cathode assembly 14 and a target 16 as described in more detail with respect to FIG. 2 below. The cathode assembly 14 accelerates a stream of electrons 18 (i.e., the electron beam) toward a target 16. According to present embodiments, the target 16 is rotatably coupled to a bearing (e.g., spiral groove bearing). The spiral groove bearing is advantageously lubricated with liquid metal, as discussed in detail below.

During operation, the target 16 rotates, which allows the stream of electrons 18 to impact different portions of the target 16 to prevent deformation and overheating of the target 16. The impact of the stream of electrons 18 on the target 16 causes the material of the target 16 to emit an X-ray beam 20. In addition to the X-ray beam 20, a large amount of thermal energy is generated during electron bombardment of the target 16, which heats the surface of the target. The temperature of the target 16, and by extension the source 12, may be controlled by a thermal control system, as described in further detail below. In a general sense, the thermal control system regulates the flow of coolant through one or more parts of the source 12. In combination with the liquid metal lubricated spiral groove bearing, which may generate heat when rotated, the thermal control system may allow thermal maintenance of the source 12 between uses (i.e., between imaging exposures).

The source 12 may be positioned proximate to a collimator 22 used to define the size and shape of the one or more X-ray beams 20 that pass into a region in which a subject 24 or object is positioned. Some portion of the X-ray beam is absorbed or attenuated by the subject 24 and the resulting X-rays 26 impact a detector array 28 formed by a plurality of detector elements. Each detector element produces an electrical signal that represents the intensity of the X-ray beam incident at the position of the detector element when the beam strikes the detector 28. Electrical signals are acquired and processed to generate one or more scan datasets.

A system controller 30 commands operation of the imaging system 10 to execute examination and/or calibration protocols and to process the acquired data. With respect to the X-ray source 12, the system controller 30 furnishes power, focal spot location, rotational speed of the target 16, control signals and so forth, for the X-ray examination sequences. In some embodiments, the system controller 30 may include a thermal control system for controlling the temperature of one or more of the components within the X-ray source 12, as discussed below. The detector 28 that receives the portion of the X-rays 26 from the source 12 is coupled to the system controller 30, which commands acquisition of the signals generated by the detector 28.

The system controller 30 may control the movement of a linear positioning subsystem 32 and a rotational subsystem 34 via a motor controller 36. In an embodiment where the imaging system 10 includes rotation of the source 12 and/or the detector 28, the rotational subsystem 34 may rotate the source 12, the collimator 22, and the detector 28 about the subject 24. It should be noted that the rotational subsystem 34 might include a gantry having both stationary components (stator) and rotating components (rotor). The linear positioning subsystem 32 may enable the subject 24, or more specifically a patient table that supports the subject 24, to be displaced linearly. Thus, the patient table may be linearly moved within the gantry or within an imaging volume (e.g., the volume located between the source 12 and the detector 28) and enable the acquisition of data from particular areas of the subject 24 and, thus the generation of images associated with those particular areas. Additionally, the linear positioning subsystem 32 may displace the one or more components of the collimator 22, so as to adjust the shape and/or direction of the X-ray beam 20. In embodiments in which the source 12 and the detector 28 are configured to provide extended or sufficient coverage along the z-axis (i.e., the axis associated with the main length of the subject 24) and/or linear motion of the subject is not required, the linear positioning subsystem 34 may be absent.

The system controller 30 may include signal processing circuitry and associated memory circuitry. In such embodiments, the memory circuitry may store programs, routines, and encoded algorithms executed by the system controller 30 to operate the imaging system 10, including the X-ray source 12 and associated thermal control system, and to process the data acquired by the detector 28. In one embodiment, the system controller 30 may be implemented as all or part of a processor-based system such as a general purpose or application-specific computer system.

The source 12 may be controlled by an X-ray controller 38 contained within the system controller 30. The X-ray controller 38 may be configured to provide power and timing signals to the source 12. In addition, in some embodiments the X-ray controller 38 may be configured to selectively activate the source 12 such that tubes or emitters at different locations within the system 10 may be operated in synchrony with one another or independent of one another. According to the approaches described herein, the X-ray controller 38 may modulate activation or operation the thermionic emitter contained within the cathode assembly 14 and the rotational speed of the target 16 to thermally regulate the source 12, as described below. Further, the X-ray controller 38 and/or system controller 30 may adjust coolant flow through portions of the source 12 to modulate the removal of thermal energy from the X-ray source 12.

The system controller 30 may include a data acquisition system (DAS) 40. The DAS 40 receives data collected by readout electronics of the detector 28, such as sampled analog signals from the detector 28. The DAS 40 may then convert the data to digital signals for subsequent processing by a processor-based system, such as a computer 42. In other embodiments, the detector 28 may convert the sampled analog signals to digital signals prior to transmission to the data acquisition system 40. The computer 42 may include or communicate with one or more suitable memory devices 46 that can store data processed by the computer 42, data to be processed by the computer 42, or routines and/or algorithms to be executed by the computer 42. The computer 42 may be adapted to control features enabled by the system controller 30 (i.e., scanning operations, data acquisition, etc.), such as in response to commands and scanning parameters provided by an operator via an operator workstation 48. From the workstation 48, the operator may input various imaging routines.

The system 10 may also include a display 50 coupled to the operator workstation 48 that allows the operator to view relevant system data, imaging parameters, raw imaging data, reconstructed data, and so forth. Additionally, the system 10 may include a printer 52 coupled to the operator workstation 48 and configured to print any desired measurement results. The display 50 and the printer 52 may also be connected to the computer 42 directly or via the operator workstation 48. Further, the operator workstation 48 may include or be coupled to a picture archiving and communications system (PACS) 54. PACS 54 may be coupled to a remote system 56, radiology department information system (RIS), hospital information system (HIS) or to an internal or external network, so that others at different locations can gain access to the image data.

As noted above, the present embodiments are directed towards passive thermal control of the X-ray source 12. In accordance with one aspect of the embodiments disclosed herein, the passive thermal control may be performed using a flow control valve 74 that is connected to one or more components of the system 10 that may affect the temperature of the source 12. Together, the control circuitry and associated components may form a thermal control system, an embodiment of which is depicted in FIG. 2. Specifically, FIG. 2 illustrates a thermal control system 60 having a control circuit 62 connected to various components of the X-ray source 12, which in the depicted embodiment is an X-ray tube 64 and is discussed below. The control circuit 62 is also connected to the rotational subsystem 34, which may be a gantry as described above.

The control circuit 62, in the illustrated embodiment, is connected to a coolant circulating system 66 configured to circulate coolant through and/or around the X-ray tube 64. Components of the coolant circulating system 66 include a heat exchanger 68 having a coolant pump 70 (e.g., a variable speed or single speed pump) and a heat exchanging fan 72, and a device for controlling the flow of coolant, such as a flow control valve 74 (e.g., a poppet valve or spring loaded plunger). The heat exchanger 68 utilizes the coolant pump 70 to motivate amounts (e.g., variable amounts or substantially continuous amounts) of coolant through one or more paths that may pass through and/or around the X-ray tube 64. Additionally, the heat exchanger 68 uses the heat exchanging fan 72 to control the amount of heat rejection from the coolant (i.e., the temperature of the coolant). In this way, both the mass flow rate of the coolant and the coolant temperature may be controlled by the control circuit 62. That is, the control circuit 62 may send control signals to the heat exchanging fan 72 and/or to the coolant pump 70 to control the amount of heat rejection from the coolant and the flow rate of the coolant, respectively. The flow control valve 74 may passively (e.g., in an open-looped manner) adjust the amount and/or location of coolant flowing through and/or around various components of the X-ray tube 64, including through a central shaft of the tube and/or a radially inward portion of the stationary shaft disposed about the center of the stationary shaft of a stationary shaft of the bearing. For example, the flow control valve 74 may be preloaded to a set value. When the flow rate (i.e., pressure) of the coolant is below the set value, the flow control valve 74 is closed and keeps the coolant from flowing into a coolant flow path within a radially inward portion of the stationary shaft disposed about the center of the stationary shaft but allows coolant flow through the center of the shaft to cool the stator region of the X-ray tube 64. When the flow rate of the coolant is at or above the set value, the flow control valve 74 is open and some of the coolant may be diverted to the radially inward portion of the stationary shaft disposed about the center of the stationary shaft while allowing coolant flow through the center of the shaft, thus, enabling the cooling of the bearing and the stator region of the X-ray tube 64.

An X-ray tube control volume 80 generally defines the area in which coolant may flow to affect the temperature of one or more components of the X-ray tube 64. The X-ray tube control volume 80 may include the X-ray tube 64 and the components contained therein, as well as flow paths, conduits, cooling jackets, and so on that may experience varying levels of coolant flow and coolant temperature for thermal regulation. Components of the X-ray tube 64 that may be considered part of the X-ray tube control volume 80, i.e., components that may affect the temperature of one or more components of the X-ray tube 64, include a motor 82 that controls the rotation of a sleeve 84 to which the target 16 is attached for rotation, and a stationary shaft 86 about which the sleeve 84 rotates, and which also includes a coolant flow path 88. In the illustrated embodiment, the coolant flow path 88 runs substantially along a longitudinal center opening of the stationary shaft 86, and allows coolant to remove thermal energy from the stationary shaft 86 and, therefore, the components that may be in direct connection and/or thermal communication with the stationary shaft 86. As described in greater detail below, another coolant flow path may run along and through the sleeve 84. According to present embodiments, passively controlling the rate of heat flux from the rotating anode assembly of the X-ray tube 64, may allow utilization of the full power capability of the X-ray tube 64 without needing to precondition the X-ray tube 64 or warm up the X-ray tube 64 from a standby state. This enables maximum patient throughput while enabling the operation of the target assembly in a non-brittle regime, thus, reducing the probability of target rupture due to high strain rates in a brittle regime.

According to certain embodiments, the bearing formed by the rotary sleeve 84 and the stationary shaft 86 may be a spiral groove bearing (SGB) 90 that is lubricated with a liquid metal material, i.e., materials that are liquid metal at room temperature, such as gallium (Ga) and/or Ga alloys. Indeed, some embodiments of the bearing 90 may conform to those described in U.S. patent application Ser. No. 12/410, 518 entitled "INTERFACE FOR LIQUID METAL BEARING AND METHOD OF MAKING SAME," filed on Mar. 25, 2009, the full disclosure of which is incorporated by reference herein in its entirety. For the purposes of the present discussion, the SGB 90 may also be referred to as the interface between the sleeve 84 and the stationary shaft 86, which is the area containing the liquid metal material and the area where shear forces are applied to the liquid metal material.

Additionally, in some embodiments, the X-ray tube control volume 80 may include the thermionic emitter 14 of the X-ray tube 64 to which the control circuit 62 may be connected, either directly or indirectly. In such a configuration, the control circuit 62 may control the flux of the electron beam 18 generated by the thermionic emitter 14, which allows the control circuit 62 to control the rate at which the target 16 is heated. However, it should be noted that the flux of the electron beam 18 may be determined based upon the parameters of a given imaging sequence in addition to or in lieu of the desired heating rate. In this way, there may be situations where the flux of the electron beam 18 suitable for a given imaging sequence may also correspond to a desired heating rate. This may allow the control circuit 62 to at least partially control the actual temperature of the target 16 and the X-ray tube components proximal thereto.

Figure 3:
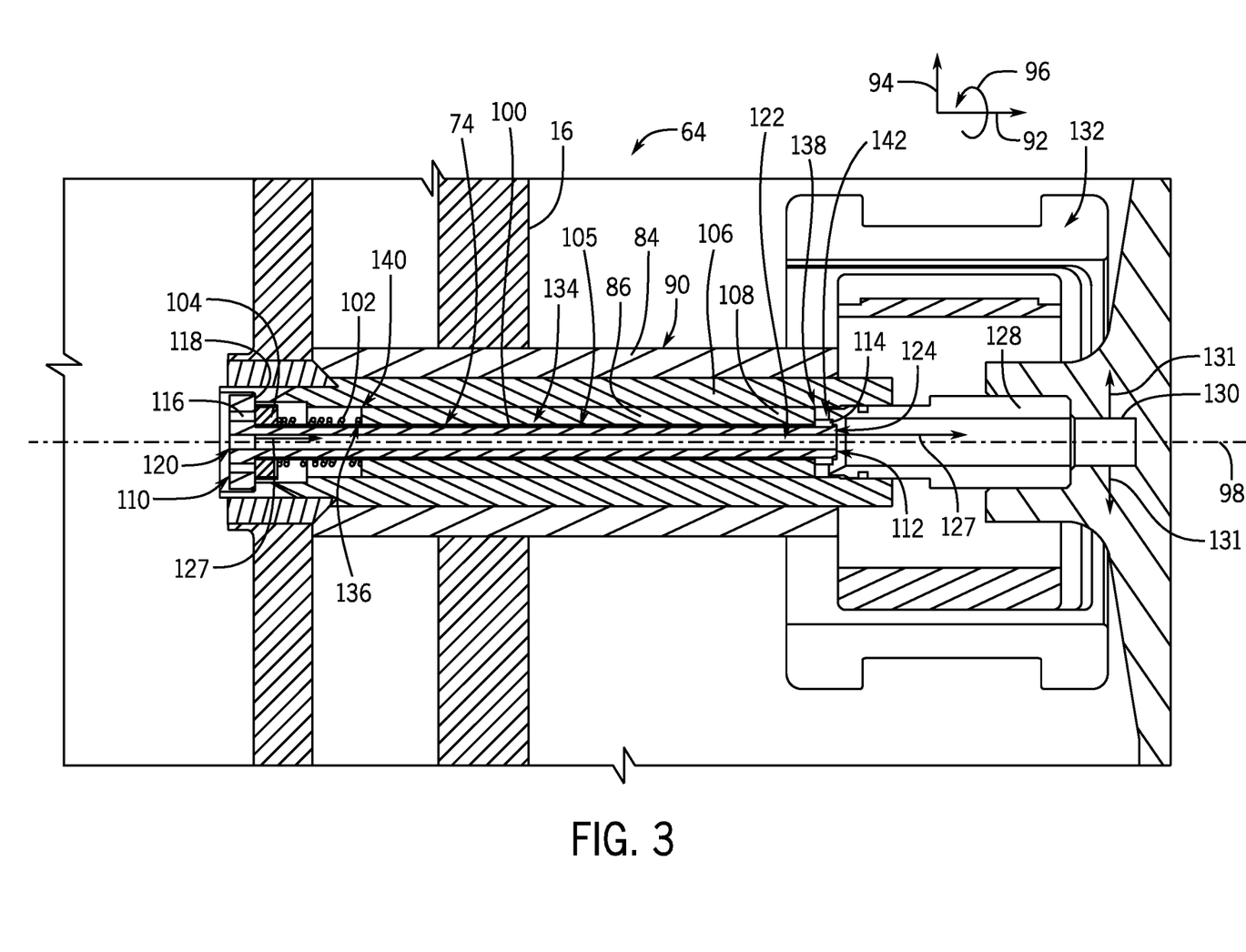
FIG. 3 is a cross-sectional view of a portion of the X-ray tube illustrating an embodiment of a flow control valve for passively controlling the temperature of an X-ray tube (e.g., having the flow control valve closed), in accordance with embodiments of the present disclosure.

FIG. 3 is a cross-sectional view of a portion of the X-ray tube 64 illustrating an embodiment of the flow control valve 74 for passively controlling the temperature of the X-ray tube 64 (e.g., having the flow control valve closed). In general, the X-ray tube 64 is as described in FIG. 2. The left and right sides of FIG. 3 may be referenced to as the cathode and motor/rotor sides, respectively. The components described herein may be described in this and subsequent figures by referencing an axial direction 92, a radial direction 94, and a circumferential direction 96 relative to a longitudinal axis 98 of the bearing 90, the stationary shaft 86, and/or the bearing sleeve 84. In general, the shaft 86 and the bearing sleeve 84 are as described in FIG. 2.

The flow control valve 74 includes a valve stem 100, a spring 102, and a spring loaded piston or plunger 104. The valve stem 100 is disposed within and extends axially 92 through a central portion 105 of the shaft 86. In particular, the shaft 86 includes an outer portion 106 and an inner portion 108 (radially 94 inward of the outer portion 106 and radially 94 outward of the center portion 105 of the shaft 86) and the valve stem 100 extends axially 92 completely through the inner portion 108. The valve stem 100 includes a first end 110 and a second end 112 disposed adjacent the cathode and motor/rotor sides, respectively. The second end 112 includes a fastener 114 (e.g., nut) that secures the valve stem 100 in place within the shaft 86. The first end 110 includes a flange 116. The flange 116 abuts a seat 118 to keep a coolant (e.g., oil) from flowing around a periphery of the flange 116. The flange 116 includes centrally located inlet 120 for receiving the coolant. The valve stem 100 includes a cavity 122 downstream of the flange 116 that extends to an outlet 124 at the second end 112. Together, the inlet 120 and the cavity 122 define a first coolant flow path 126. Coolant flows axially 92 from the cathode side towards the motor/rotor side through the first coolant flow path 126 (as indicated by arrows 127) into a shaft adapter 128 where eventually the coolant exits radially 94 via holes 130 (as indicated by arrows 131) to cool a stator region 132 (e.g., between the stator and the motor can) of the X-ray tube 64. Coolant flows through the first coolant path 126 whether the flow control valve 74 is open or closed.

Figure 4:
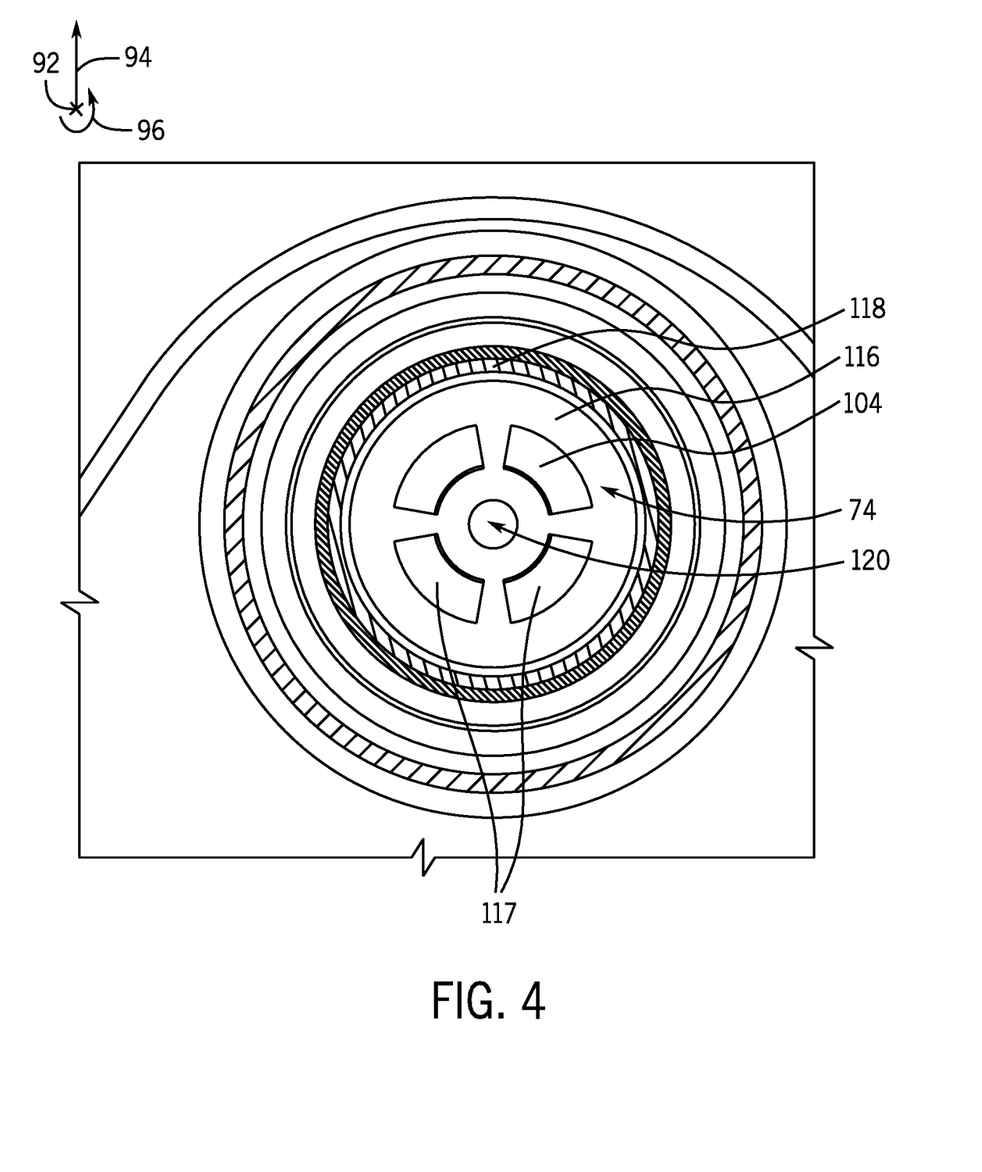
FIG. 4 is an end view of the flow control valve in FIG. 3.
Figure 5:
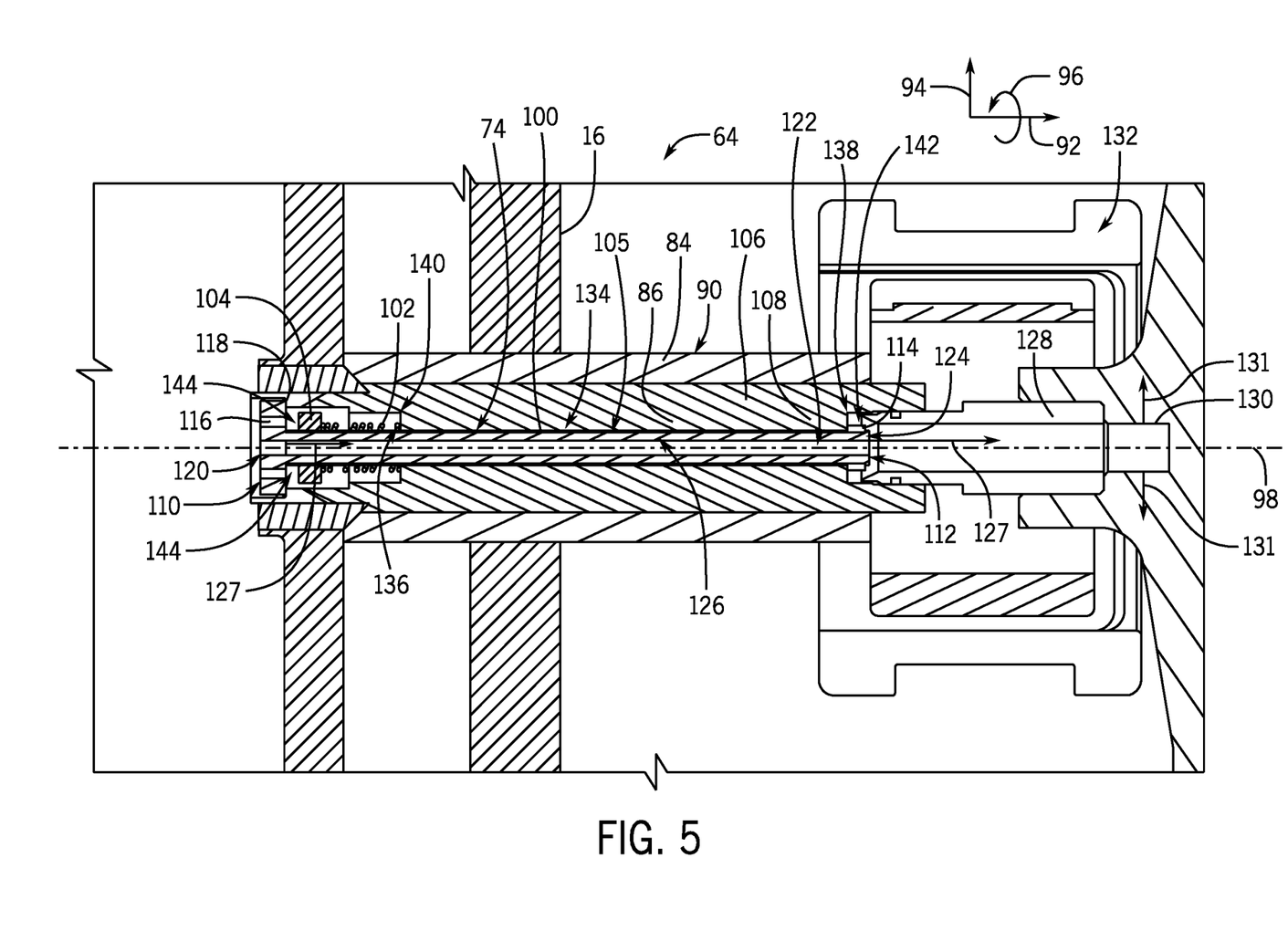
FIG. 5 is a cross-sectional view of the portion of the X-ray tube in FIG. 3 (e.g., having the flow control valve open)

As depicted, the flow control valve 74 is closed. The flow control valve 74 is spring loaded to a set value. As depicted, the spring 102 contacts the inner portion 108 of the shaft 86 and the plunger 104. The spring 102 exerts the preload force against the plunger 104 causing the plunger 104 to abut against the flange 116. The flange 116 includes multiple openings 117 (see FIG. 4) circumferentially 96 spaced apart from each other and disposed radially 94 outward of the inlet 120. The openings 117 extend both circumferentially 96 and radially 94. The number of openings 117 may vary (as depicted the flange 116 includes four openings 117). When the plunger 104 abuts the flange 116 it blocks flow of the coolant through the openings 117 and into a second coolant flow path 134. The inner portion 108 of the shaft 86 includes multiple fins circumferentially 96 spaced apart from each other (see FIG. 7) that extend axially 92 along an entire length of the inner portion 108 from a first end 136 to a second end 138. The first end 136 and the second end 138 may serve as either inlets or outlets for the second coolant flow path 134. As depicted, the first end 136 and the second end 138 function as an inlet 140 and an outlet 142, respectively. The fins define flow channels for the coolant to cool the shaft 86 (and the bearing 90) in both axial 92 and circumferential directions 96. When the flow rate (i.e., pressure) of the coolant is below the set value (i.e., less than the preloaded force), then the valve 74 is closed (i.e., the plunger 104 abuts the flange 116) and coolant does not flow into the second coolant flow path 134. In this closed position (e.g., during standby mode), the flow control valve 74 may minimize the rate of heat flux from the rotating anode assembly, when it is advantageous to keep the target assembly in a non-brittle regime to keep from having to undergo X-ray tube 64 warm up. However, as depicted in FIG. 5, when the flow rate (i.e., pressure) of the coolant is equal to or greater than the set value (e.g., prior to start of an X-ray exposure and shortly afterwards), the coolant flow through the openings in the flange 116 axially 92 displaces the plunger 104 towards the first end 136 of the inner portion 108 of the shaft 86 opening the valve 74 and enabling coolant to flow around the plunger 104 and into the second coolant flow path 134 via inlet 140 (as depicted by arrows 144). This results in the split of the coolant flow between the stator region 132 and the bearing 90. Prior to start of an X-ray exposure and shortly afterwards, the flow control valve 74 may maximize the rate of heat flux from the rotating anode assembly in order to maximize patient throughput.

Figure 6:
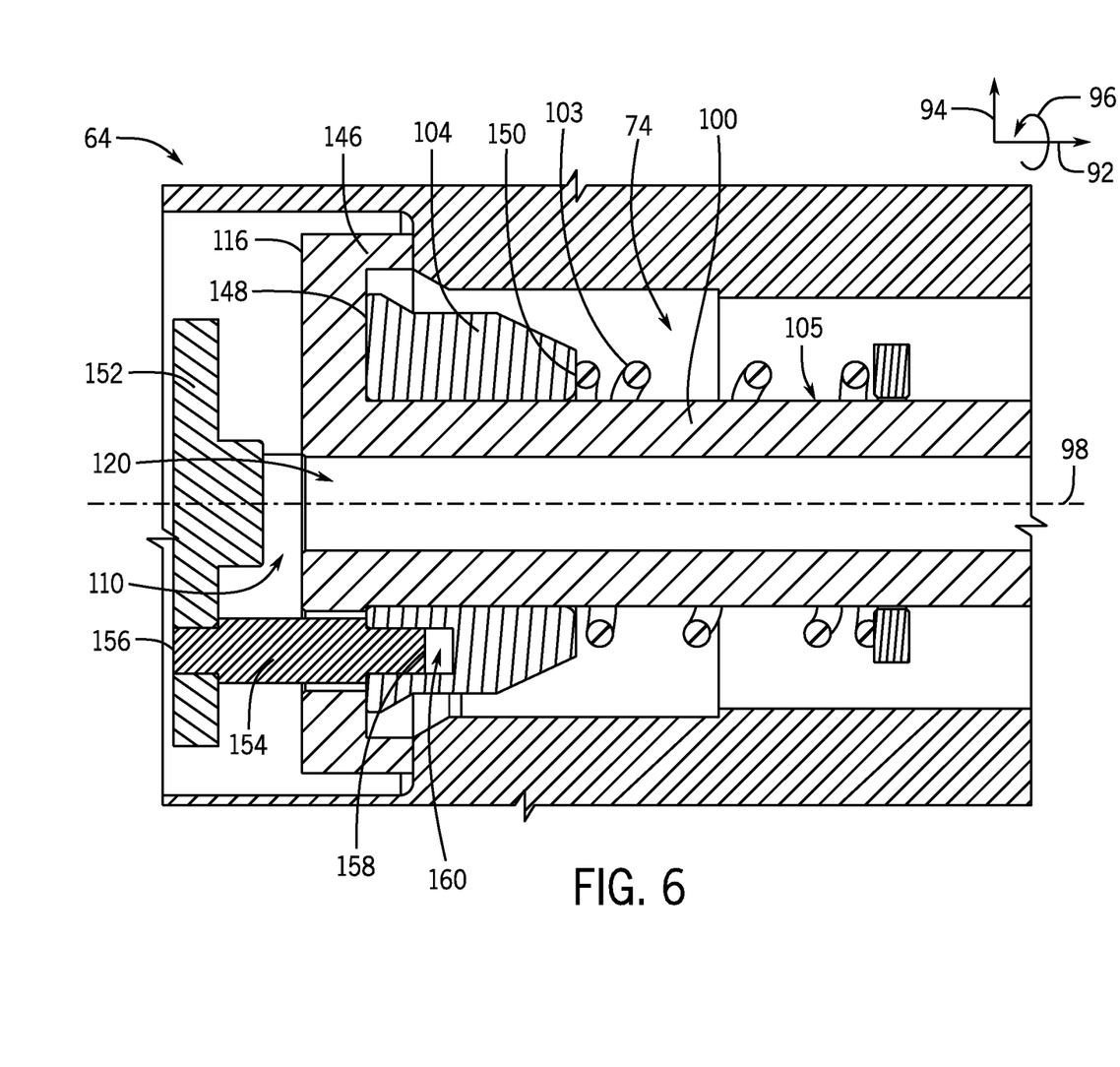
FIG. 6 is a cross-sectional view of a portion of the X-ray tube illustrating an embodiment of a flow control valve for passively controlling the temperature of an X-ray tube (e.g., having an L-shaped flange), in accordance with embodiments of the present disclosure.
Figure 7:
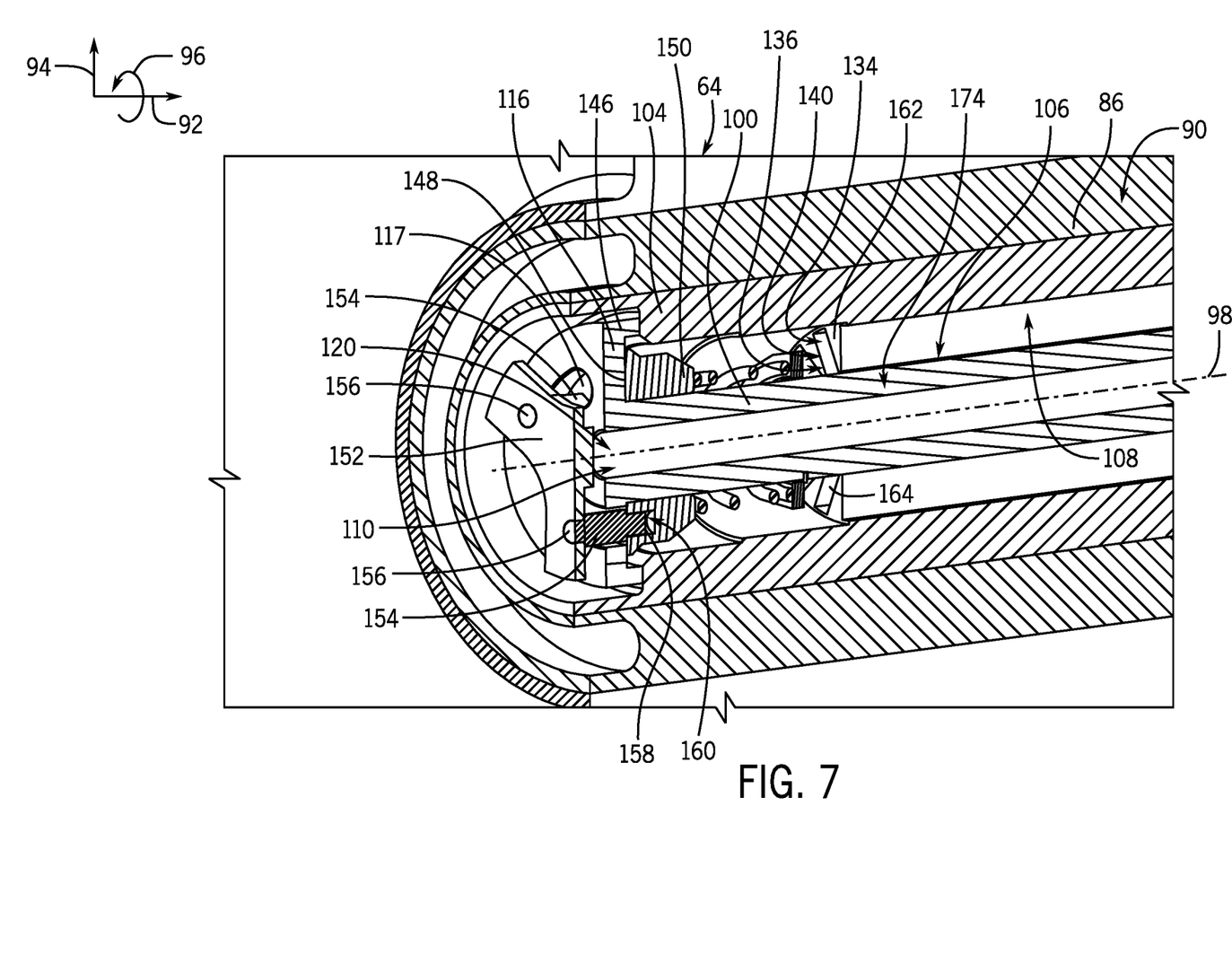
FIG. 7 is a perspective cross-sectional view of a portion of the X-ray tube in FIG. 6.

In certain embodiments, the shape of the flange 116 and/or the plunger 104 may vary. For example, as depicted in FIGS. 6 and 7, the flange 116 includes an L-shaped cross-sectional shape extending radially 94 from adjacent the inlet 120. An axial portion 146 of the flange 116 abuts the seat 118. The plunger 104 include a tapered profile. In particular, the plunger 104 tapers from a first end 148 (e.g., adjacent the flange 116) to a second end 150 in the axial direction 92. In certain embodiments, a plate 152 is coupled to the flange 116. The plate 152 is coupled to multiple pins or protrusions 154. Each pin 154 extends into and through a portion of a respective opening 117 of the flange 116. Each pin 154 includes a first end 156 and a second end 158. The first end 156 engages the plate 152. The second end 158 engages recesses or cavities 160 within the plunger 104 when the valve 74 is in the closed position. The plunger 104 includes multiple cavities 160 to engage respective pins 154.

As described above and depicted in FIG. 7, the inner portion 108 of the shaft 86 includes multiple fins 162 circumferentially 96 spaced apart from each other (see FIG. 7) that extend axially 92 along an entire length of the inner portion 108 from a first end 136 to the second end. In this embodiment, the first end 136 serves as the inlet 140 for the second coolant flow path 134. The fins 162 define flow channels 164 for the coolant to cool the shaft 86 (and the bearing 90) in both axial 92 and circumferential directions 96.

Figure 8:
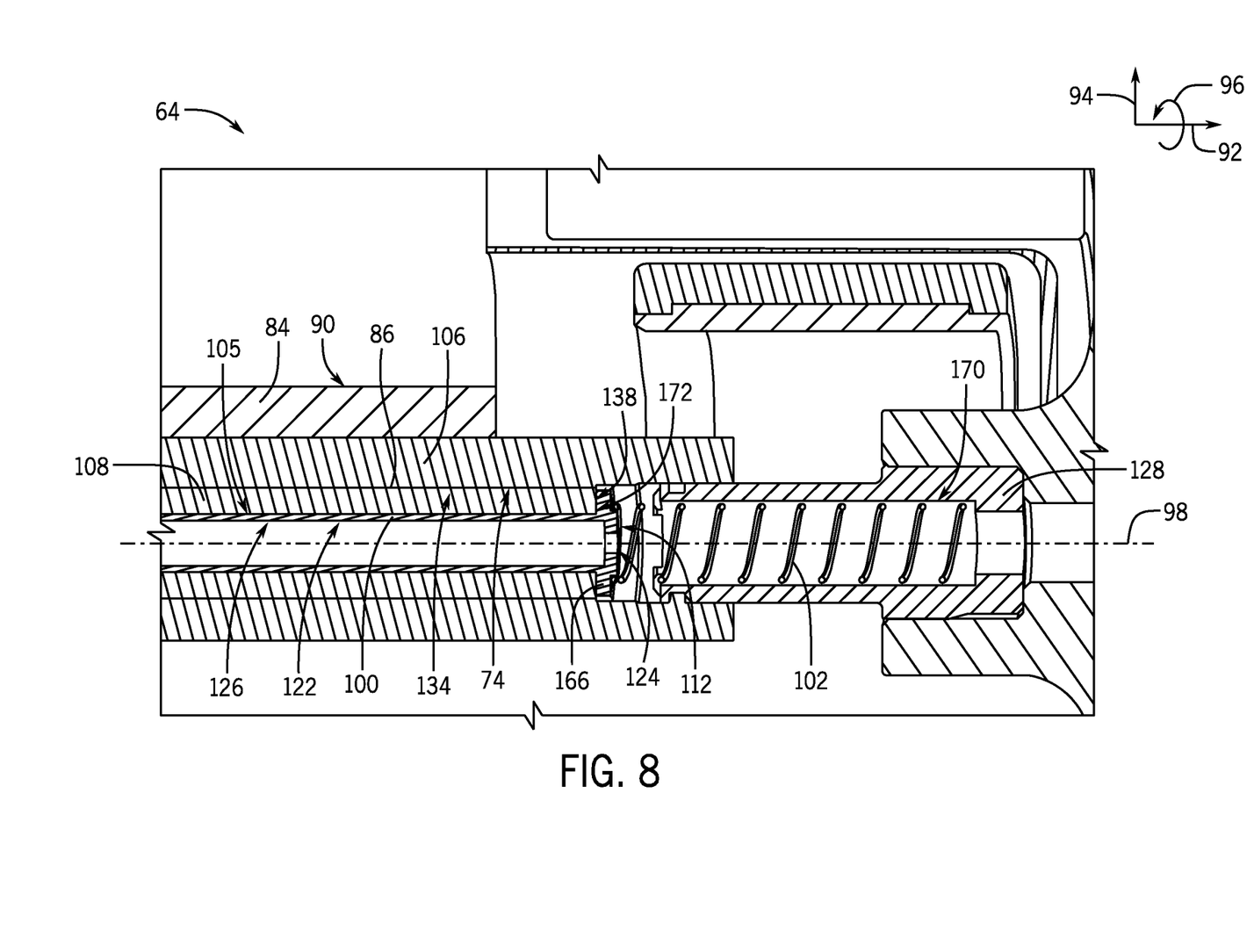
FIG. 8 is a cross-sectional view of a portion of the X-ray tube illustrating an embodiment of a flow control valve for passively controlling the temperature of an X-ray tube (e.g., having the flow control valve closed), in accordance with embodiments of the present disclosure.
Figure 9:
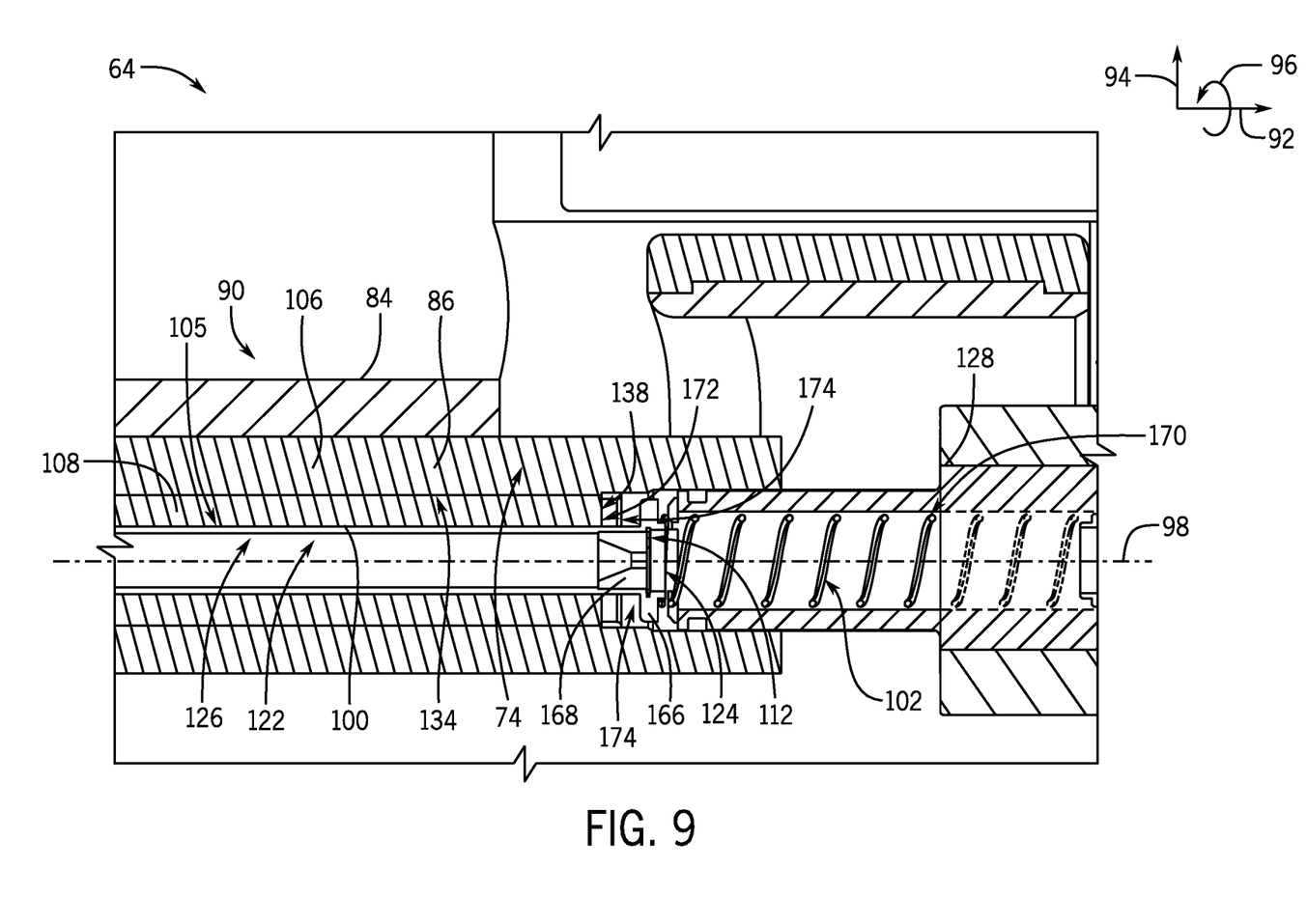
FIG. 9 is a cross-sectional view of the portion of the X-ray tube in FIG. 8 (e.g., having the flow control valve closed).

In certain embodiments, portions of the flow control valve 74 may be disposed on the motor/rotor side of the X-ray tube 64. FIGS. 8 and 9 are cross-sectional views of a portion of the X-ray tube 64 illustrating an embodiment of the flow control valve 74 for passively controlling the temperature of an X-ray tube having the flow control valve 74 closed and open, respectively.

The flow control valve 74 includes the valve stem 100 and the spring 102. The valve stem 100 is disposed within and extends axially 92 through the central portion 105 of the shaft 86. In particular, the shaft 86 includes an outer portion 106 and an inner portion 108 as described above and the valve stem 100 extends axially 92 completely through the inner portion 108. The valve stem 100 includes the first end (see FIG. 3) and a second end 112 disposed adjacent the cathode and motor/rotor sides, respectively. The second end 112 includes a flange 166. The flange 166 (when the valve 74 is closed) abuts the end 138 of the inner portion 108 of the shaft 86 to keep a coolant (e.g., oil) from flowing into the second coolant flow path 134 described above. The flange 116 includes the centrally located outlet 124 for discharging the coolant from the first coolant flow path 126. In certain embodiments (see FIG. 9), an insert 168 disposed within the second end 112 may define the outlet 124. As described above, coolant flows axially 92 from the cathode side towards the motor/rotor side through the first coolant flow path 126 into the shaft adapter 128 where eventually the coolant exits radially 94 via holes (see FIG. 3) to cool a stator region of the X-ray tube 64. Coolant flows through the first coolant path 126 whether the flow control valve 74 is open or closed.

The flow control valve 74 is spring loaded to a set value. As depicted, the spring 102 contacts both the shaft adapter 128 and the flange 166. In particular, a portion 170 of the spring 102 may extend axially 92 into the shaft adapter 128. The spring 102 exerts the preload force against the flange 166 causing the flange 166 to abut against the end 138 of the second coolant flow path 134 (when the valve 74 is closed). When the flange 166 abuts the end 138 it blocks flow of the coolant into the second coolant flow path 134. As depicted, the second end 138 functions as an inlet 172. When the flow rate (i.e., pressure) of the coolant is below the set value (i.e., less than the preloaded force), then the valve 74 is closed (i.e., the flange 166 abuts the end 138) and coolant does not flow into the second coolant flow path 134. In this closed position (e.g., during standby mode), the flow control valve 74 may minimize the rate of heat flux from the rotating anode assembly, when is advantageous to keep the target assembly in a non-brittle regime to keep from having to undergo X-ray tube 64 warm up. However, as depicted in FIG. 9, when the flow rate (i.e., pressure) of the coolant is equal to or greater than the set value (e.g., prior to start of an X-ray exposure and shortly afterwards), the coolant flow axially 92 displaces the flange 166 towards the shaft adapter 128 opening the valve 74 and enabling coolant to inlet 172 and into the second coolant flow path 134 (as depicted by arrows 174). This results in the split of the coolant flow between the stator region and the bearing 90. Prior to start of an X-ray exposure and shortly afterwards, the flow control valve 74 may maximize the rate of heat flux from the rotating anode assembly in order to maximize patient throughput.

Technical effects of the disclosed embodiments include providing the flow control valve that enables passive (e.g., in an open-looped manner) control of cooling portions of the X-ray tube. In particular, when the flow control valve is closed, it enables coolant flow to cooling the stator region of the X-ray tube. When the flow control valve is open, it splits the coolant flow between the stator region and the bearing. The disclosed embodiments enables the rotating anode assembly of the X-ray tube to operate without operating in a brittle regime. In addition, the disclosed embodiments, reduce the probability of a target rupture and X-ray tube failure. Future, the disclosed embodiments enable utilization of the X-ray tube without warm up to provide on demand power capability and to increase patient throughput.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for passive thermal control of an X-ray tube, comprising:
   an X-ray tube having an electron beam target and comprising a rotary bearing assembly supporting the electron beam target in rotation, wherein the rotary bearing assembly comprises:
   a stationary shaft;
   a bearing sleeve configured to rotate with respect to the stationary shaft during operation of the X-ray tube;
   a first coolant flow path extending through a center of the stationary shaft;
   a second coolant flow path disposed through a radially inward portion of the stationary shaft disposed about the center of the stationary shaft;
   a flow control valve configured to passively regulate flow of coolant through the second coolant flow path based on a pressure of the coolant.

2. The system of claim 1, wherein the flow control valve comprises a valve stem extending through the center of the stationary shaft, and the valve stem comprises a first end comprising an inlet for the first coolant flow path and a second end disposed opposite the first end comprising an outlet for the first coolant flow path.

3. The system of claim 2, wherein the flow control valve comprises a spring disposed adjacent the second end of the valve stem, the flow control valve is configured when closed to block the coolant from entering the second coolant flow path, and flow control valve is configured when open to allow the coolant to flow into the second coolant flow path.

4. The system of claim 3, wherein the valve stem comprises a flange on the second end, wherein the flange is configured to contact an inlet for the second coolant flow path to block flow of the coolant into the second coolant flow path when the flow control valve is closed, and the flange is configured to not contact the second inlet to allow flow of the coolant into the second coolant flow path when the flow control valve is open.

5. The system of claim 3, wherein the flow control valve is spring loaded to a set value, the flow control valve is configured to be closed when the pressure of the coolant is below the set value, the flow control valve is configured to open when the pressure of the coolant is at or above the set value.

6. The system of claim 3, wherein the flow control valve is configured to allow the coolant to exit the outlet of the first coolant flow path whether the flow control valve is open or closed.

7. The system of claim 2, wherein the flow control valve comprises a spring disposed adjacent the first end of the valve stem, the flow control valve is configured when closed to block the coolant from entering the second coolant flow path, and flow control valve is configured when open to allow the coolant to flow into the second coolant flow path.

8. The system of claim 7, wherein the valve stem comprises a flange on the first end and a piston disposed about the valve steam, wherein the piston is configured to contact the flange to block flow of the coolant into the second coolant flow path when the flow control valve is closed, and the piston is configured to not contact the flange to allow flow of the coolant into the second coolant flow path when the flow control valve is open.

9. The system of claim 8, wherein the flange comprises a plurality of openings disposed about the inlet of the valve stem, wherein when the piston contacts the flange the piston blocks the coolant from flowing through the plurality of openings into the second coolant flow path, and when the piston does not contact the flange flow of the coolant into the second coolant flow path is allowed.

10. The system of claim 9, wherein the flow control valve comprises a plate coupled to a plurality of pins, wherein the plurality of pins are configured to extend into the plurality of openings and into respective recesses of the piston to secure the piston to the flange to block the coolant from flowing through the plurality of openings when the flow control valve is closed.

11. The system of claim 7, wherein the flow control valve is spring loaded to a set value, the flow control valve is configured to be closed when the pressure of the coolant is below the set value, the flow control valve is configured to open when the pressure of the coolant is at or above the set value.

12. The system of claim 1, wherein the second coolant flow path is defined by a plurality of fins circumferentially spaced apart from each other and extending along a longitudinal axis of the stationary shaft.

13. The system of claim 1, wherein the system is configured to maintain a temperature of the electron beam target so as to eliminate a user-initiated warmup of the electron beam target between X-ray examinations.

14. An imaging system, comprising:
   a system for passive thermal control of an X-ray tube, comprising:
      an X-ray tube having an electron beam target and comprising a rotary bearing assembly supporting the electron beam target in rotation, wherein the rotary bearing assembly comprises:
         a stationary shaft;
         a bearing sleeve configured to rotate with respect to the stationary shaft during operation of the X-ray tube;
         a first coolant flow path extending through a center of the stationary shaft;
         a second coolant flow path disposed through a radially inward portion of the stationary shaft disposed about the center of the stationary shaft; and
         a flow control valve configured to passively regulate flow of coolant through the second coolant flow path based on a pressure of the coolant;
   a digital detector configured to receive radiation from the X-ray tube transmitted through a subject of interest; and
   an image acquisition circuit configured to control acquisition of image data from the detector.

15. The imaging system of claim 14, wherein the X-ray tube and the digital detector are disposed on a gantry for rotation about the subject.

16. The imaging system of claim 14, wherein the components of the X-ray tube comprise the electron beam target and the rotary bearing supporting the target in rotation.

17. The imaging system of claim 14, wherein the flow control valve comprises a valve stem extending through the center of the stationary shaft, and the valve stem comprises a first end comprising an inlet for the first coolant flow path and a second end disposed opposite the first end comprising an outlet for the first coolant flow path, and wherein the flow control valve comprises a spring disposed adjacent the second end of the valve stem, the flow control valve is configured when closed to block the coolant from entering the second coolant flow path, and flow control valve is configured when open to allow the coolant to flow into the second coolant flow path.

18. The imaging system of claim 14, wherein the flow control valve comprises a valve stem extending through the center of the stationary shaft, and the valve stem comprises a first end comprising an inlet for the first coolant flow path and a second end disposed opposite the first end comprising an outlet for the first coolant flow path, and wherein the flow control valve comprises a spring disposed adjacent the first end of the stationary shaft, the flow control valve is configured when closed to block the coolant from entering the second coolant flow path, and flow control valve is configured when open to allow the coolant to flow into the second coolant flow path.

19. The imaging system of claim 14, wherein the system for passive thermal control of the X-ray tube is configured to maintain a temperature of the electron beam target so as to eliminate a user-initiated warmup of the electron beam target between X-ray examinations.

20. A system for passive thermal control of an X-ray tube, comprising:
   an X-ray tube having an electron beam target and comprising a rotary bearing assembly supporting the electron beam target in rotation, wherein the rotary bearing assembly comprises:
      a stationary shaft;
      a bearing sleeve configured to rotate with respect to the stationary shaft during operation of the X-ray tube;
      a first coolant flow path extending through a center of the stationary shaft, wherein the stationary shaft comprises a first end having an inlet for the first coolant flow path and a second end disposed opposite the first end having an outlet for the first coolant flow path;
      a second coolant flow path disposed through a radially inward portion of the stationary shaft disposed about the center of the stationary shaft;
      a flow control valve configured to passively regulate flow of coolant through the second coolant flow path based on a pressure of the coolant, wherein the flow control valve comprises a spring disposed adjacent the first end or the second end of the stationary shaft, and the flow control valve is configured when closed to block the coolant from entering the second coolant flow path, and flow control valve is configured when open to allow the coolant to flow into the second coolant flow path.

* * * * *